(12) United States Patent
Newsome

(10) Patent No.: US 9,869,412 B2
(45) Date of Patent: *Jan. 16, 2018

(54) ANISOTROPIC PIPE LINER

(71) Applicant: HIGHLAND INDUSTRIES, INC., Kernersville, NC (US)

(72) Inventor: James Rollings Newsome, Cheraw, SC (US)

(73) Assignee: HIGHLAND INDUSTRIES, INC., Kernersville ( * ) Notice: Subject to any disclaimer, the term of this patent is extended or adjusted under 35 U.S.C. 154(b) by 0 days.

This patent is subject to a terminal disclaimer.

(21) Appl. No.: 15/498,553

(22) Filed: Apr. 27, 2017

(65) Prior Publication Data

US 2017/0227146 A1  Aug. 10, 2017

Related U.S. Application Data

(63) Continuation-in-part of application No. 14/502,079, filed on Sep. 30, 2014, now Pat. No. 9,664,310.

(51) Int. Cl.
  *F16L 11/00* (2006.01)
  *F16L 11/02* (2006.01)
  *F16L 11/14* (2006.01)

(52) U.S. Cl.
  CPC ............. *F16L 11/02* (2013.01); *F16L 11/14* (2013.01)

(58) Field of Classification Search
  CPC ...................................................... F16L 9/147
  USPC .................... 138/123–127, 129, 130, 139
  See application file for complete search history.

(56) References Cited

U.S. PATENT DOCUMENTS

| 2,514,905 | A |   | 7/1950  | Solero |
|-----------|---|---|---------|--------|
| 3,790,438 | A |   | 2/1974  | Lewis et al. |
| 3,856,052 | A |   | 12/1974 | Feucht |
| 3,866,633 | A |   | 2/1975  | Taylor |
| 4,007,070 | A |   | 2/1977  | Busdiecker |
| 4,320,160 | A |   | 3/1982  | Nishimura et al. |
| 4,488,577 | A |   | 12/1984 | Shilad et al. |
| 4,510,974 | A |   | 4/1985  | Natori et al. |
| 4,698,260 | A |   | 10/1987 | Sasaki et al. |
| 4,840,201 | A | * | 6/1989  | Botsolas ............. F16L 59/11 138/149 |
| 4,898,212 | A |   | 2/1990  | Searfoss et al. |
| 4,929,478 | A |   | 5/1990  | Conaghan et al. |
| 5,022,459 | A | * | 6/1991  | Chiles ................. E01C 11/26 138/125 |
| 5,052,444 | A |   | 10/1991 | Messerly et al. |

(Continued)

*Primary Examiner* — Patrick F Brinson
(74) *Attorney, Agent, or Firm* — Tuggle Duggins P.A.; Blake Hurt

(57) ABSTRACT

A pipe including an inner layer, an outer layer, a jacket layer, and an anisotropic layer positioned between the jacket and outer layers is provided. The anisotropic layer is formed from weaving a number of more rigid, monofilament fill strands and a number of less rigid multifilament warp strands. The fill strands may be formed from single, six hundred-ten (610) denier polyester filament while the warp strands may be formed from a series of two hundred-twenty (220) denier polyester threads. The anisotropic layer permits limited rotation of the inner and outer pipe layers without inserting into the gaps formed by the jacket layer when exposed to intense heat and pressure and is not subjected to significant creep during use.

17 Claims, 4 Drawing Sheets

(56) References Cited

U.S. PATENT DOCUMENTS

| | | | |
|---|---|---|---|
| 5,065,757 A * | 11/1991 | Dragisic | A61M 16/04 128/207.14 |
| 5,261,462 A | 11/1993 | Wolfe et al. | |
| 5,413,149 A | 5/1995 | Ford et al. | |
| 5,843,542 A | 12/1998 | Brushafer et al. | |
| 5,939,216 A | 8/1999 | Kameda et al. | |
| 8,322,382 B2 | 12/2012 | Slagsvold et al. | |
| 8,678,042 B2 | 3/2014 | Quigley et al. | |
| 8,701,255 B1 | 4/2014 | Cavallaro | |
| 8,746,289 B2 * | 6/2014 | Quigley | F16L 11/083 138/123 |
| 2006/0151043 A1 * | 7/2006 | Nanney | B32B 1/08 138/125 |
| 2012/0174358 A1 | 7/2012 | Cavallaro | |

* cited by examiner

ANISOTROPIC PIPE LINER

This is a continuation-in-part of and claims benefits under pending prior application Ser. No. 14/502,079 filed 30 Sep. 2014, now U.S. Pat. No. 9,664,310, which is incorporated by reference in its entirety herein.

FIELD OF THE INVENTION

The invention herein pertains to unidirectional-flexing fabrics and particularly pertains to an anisotropic pipe liner.

DESCRIPTION OF THE PRIOR ART AND OBJECTIVES OF THE INVENTION

Reinforced pipe for uses such as water, carbon dioxide, and oil and gas acquisition or transportation is known in the art. Typically, these reinforced pipes comprise an inner layer, a reinforcement layer, and an outer layer or shield. The inner and outer layers may be formed from a material such as high density polyethylene which is resistant to degradation such as corrosion, while the reinforcement layer may be formed from a more structurally rigid layer such as steel. Although structural sleeves have long been a solution to preventing pipe collapse, the specific operating environment and performance requirements of underground exploration and collection pipes necessitate a more flexible solution.

Woven metal jackets positioned between the inner and outer pipe layers permit limited flexing of the pipe while simultaneously affording structural stability during operation. However, a significant problem known as "creep" arises when the inner and outer pipe layers are subjected to significant heat and pressure typically associated with subterranean work environments. Given that the metal jackets are not restrictive to longitudinal lengthening, the pipe layers can become distressed and often degrade in a short period of time. Further, because separation between the metal jacket plates or weave may also occur during creep, the jacket no longer bestows the desired structural support. Efforts to restrict the creep of the metal jacket, for example by utilizing polymeric films or sheets formed from materials such as biaxially-oriented polyethylene terephthalate (Mylar®) have proved ineffective.

Thus, in view of the problems and disadvantages associated with prior art devices, the present invention was conceived and one of its objectives is to provide an anisotropic pipe liner to prevent the creep of a metal jacket positioned between inner and outer pipe layers.

It is another objective of the present invention to provide an anisotropic pipe liner comprised of a more rigid monofilament fill strand and a less rigid warp strand.

It is still another objective of the present invention to provide an anisotropic pipe liner with a monofilament polyester fill strand.

It is yet another objective of the present invention to provide an anisotropic pipe liner with a two hundred twenty (220) denier, thirty-four (34) thread warp strand.

It is a further objective of the present invention to provide an anisotropic pipe liner with a hot melt fusion selvage.

It is still a further objective of the present invention to provide an anisotropic web formed from a fill material defining a high bending or flexibility modulus.

It is yet a further objective of the present invention to provide an anisotropic web formed from a warp material defining a lower bending or flexibility modulus compared to the fill material.

It is another objective of the present invention to provide an anisotropic pipe liner that is longitudinally flexible but laterally stiff, allowing the pipe to be rolled when not in use.

It is a further objective of the present invention to provide an anisotropic pipe liner in combination with a woven jacket formed from a fiberglass material.

Various other objectives and advantages of the present invention will become apparent to those skilled in the art as a more detailed description is set forth below.

SUMMARY OF THE INVENTION

The aforesaid and other objectives are realized by providing an anisotropically flexible pipe liner that is flexible along a longitudinal axis but stiff along a lateral axis. This pipe liner is positioned between a corrosion resistant polymeric inner pipe layer and a corrosion resistant high density polyethylene outer layer, along the exterior surface of pivotable plates that form a steel reinforced jacket or a jacket formed out of fiberglass. The pipe liner is formed from a web woven from a plurality of laterally oriented warp strands and a number of longitudinally oriented monofilament fill strands. The warp strands are formed from two hundred twenty (220) denier, thirty-four (34) thread count strands, while the fill strands are formed from polyester monofilament threads with a one-quarter (0.25) millimeter diameter strand. In use, the fiberglass jacket permits a limited amount of pipe flexibility, including the ability to roll the pipe during storage and transportation, but the pipe liner resists heat and temperature common to the work environment of an oil and gas pipe, clearing the jacket to prevent buckling and degradation of the pipe exterior while resisting creep.

DETAILED DESCRIPTION OF THE PREFERRED EMBODIMENT AND OPERATION OF THE INVENTION

Figure 1:
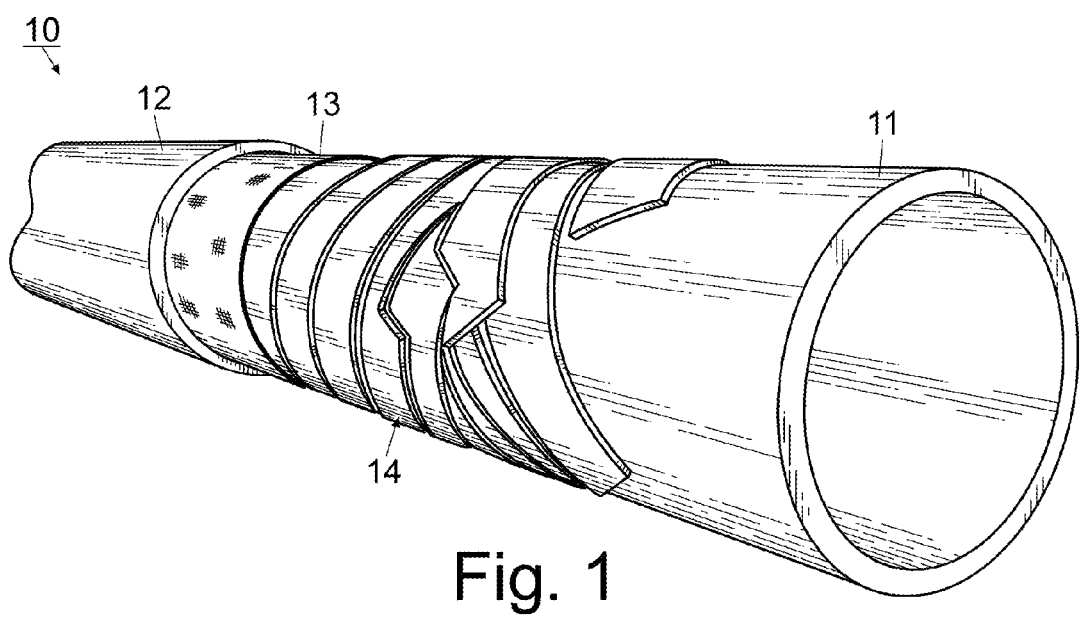
FIG. 1 shows a side perspective view of a pipe in a first position with an anisotropic liner.
Figure 2:
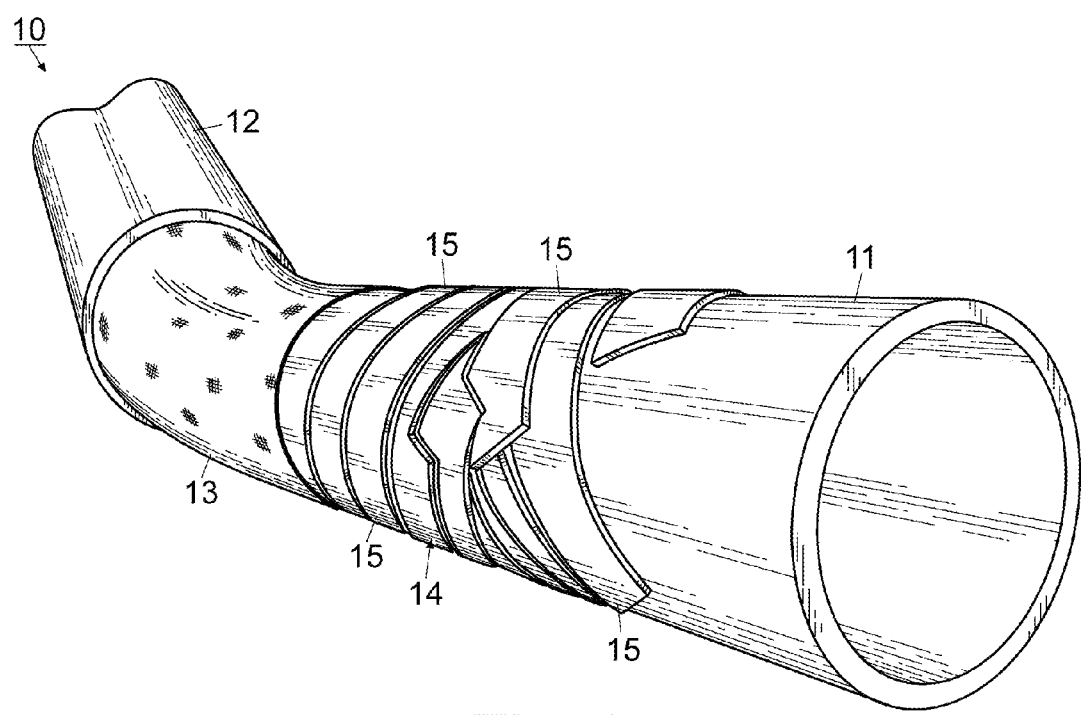
FIG. 2 pictures a side perspective view of the pipe of FIG. 1 in a second position.

For a better understanding of the invention and its operation, turning now to the drawings, FIGS. 1 and 2 illustrate side perspective views of pipe 10, including inner pipe 11, outer pipe 12 (sometimes referred to as a shield), pipe liner 13, and jacket 14. Inner pipe 11 and outer pipe 12 are each cylinders formed from a corrosion resistant polymeric material such as high density polyethylene, although other materials that are corrosion resistant and capable of withstanding prolonged heat and pressure are considered within the scope of pipes 11 and 12, respectively. Jacket 14 is preferably a flexible covering formed from metallic plates 15 which are overlappingly interwoven to permit a limited degree of rotation by pipe 10, but may also be formed from a material defined by woven glass filaments (not shown) conventionally referred to as fiberglass. When such rotation occurs, gaps (not shown) are formed between plates 15, and given the heat and pressure often present in the working environment of pipe 10, a portion of outer pipe 12 may become pliable and become inserted within the gaps. This leads to dimpling and buckling in the exterior surface of outer pipe 12, and over time may cause pipe 10 to fail.

Figure 3:
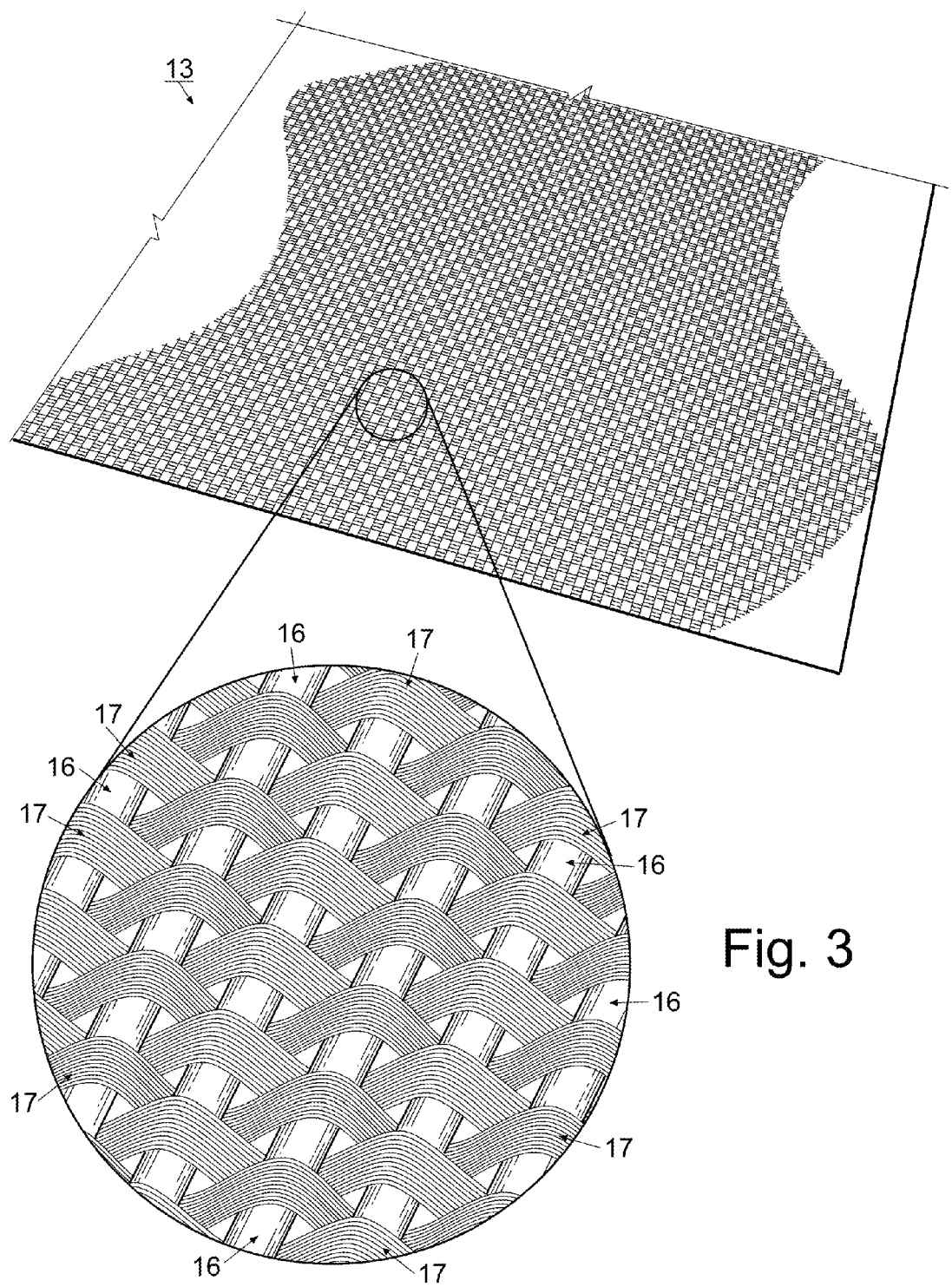
FIG. 3 depicts a side perspective view of the pipe liner of FIG. 1 with a portion magnified.
Figure 4:
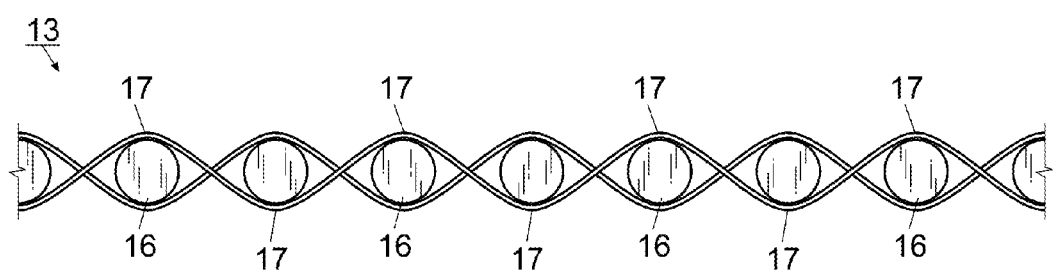
FIG. 4 demonstrates an elevated plan view of a lateral side view of the pipe liner of FIG. 1.
Figure 5:
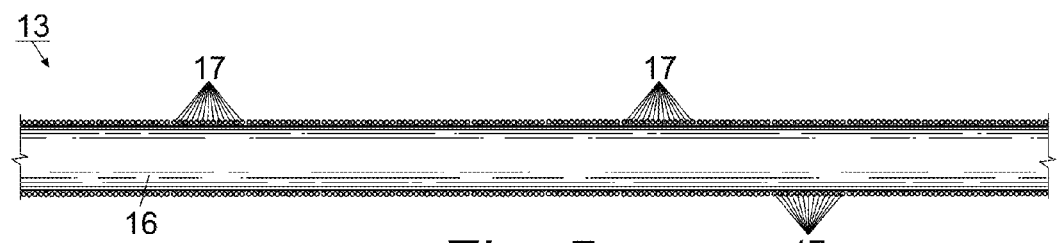
FIG. 5 illustrates an elevated plan view of a longitudinal side view of the pipe liner of FIG. 1.

For this reason, preferred pipe 10 includes cylindrical pipe liner 13 disposed longitudinally between outer pipe 12 and metal jacket 14. Pipe liner 13 as seen in FIGS. 3, 4 and 5 is preferably a woven anisotropic fabric formed from rigid, larger diameter monofilament fill strands 16 and less rigid, smaller diameter multifilament warp strands 17. Fill strands 16 define a greater modulus of flexibility than warp strands 17, resulting in a web that can be easily rolled on a spool for storage and transportation and does not sink into the aforementioned gaps but does permit the limited play described above with respect to jacket 14. Preferably, fill strands 16 are formed from polymeric material such as polyester configured into a single six hundred ten (610) denier thread (i.e. monofilament) defining a diameter of one-quarter millimeter (0.25 mm) Warp strands 17 are preferably formed from a plurality of two hundred-twenty (220) denier polyester threads, and while the exact number of threads utilized in a given warp strand 17 may vary, thirty-four (34) threads are most preferred for an efficient manufacturing process resulting in a fabric with advantageous anisotropic features.

Fill strands 16 and warp strands 17 are woven in a plain weave pattern with a straight draw as shown in FIG. 3, whereby the warp strands 17 pass laterally in alternating orientation above and below subsequent fill strands 16. Pipe liner 13 can be formed on a number of weaving machines, but preferred pipe liner 13 is woven on a weaving machine configured with highly polished reeds, heddles, and four (4) groups of drop wires (not shown), such as a two hundred-twenty centimeter (220 cm) Picanol Optimax Rapier™ weaving machine. The preferred total reed spread is seventy-eight and six hundredths of an inch (78.06") at twenty-one and an eighth (21.625) dents, with a usable reed spread of seventy-seven and a half inch (77.50") totaling one thousand six hundred eighty-eight (1688) dents and one thousand six hundred seventy-six (1676) usable dents.

As shown in FIGS. 4 and 5, unfinished edges of pipe liner 13 present the various ends of fill strands 16 and warp strands 17, respectively. FIG. 4 displays a lateral end of pipe liner 13, emphasizing the significant cross-sectional size difference between fill strands 16 and warp strands 17. FIG. 5 illustrates the multitude of threads utilized to form warp strands 17, compared to the monofilament thread defining fill strand 16. While FIGS. 4 and 5 represent unfinished edges of pipe liner 13, preferred pipe liner 13 includes treated lateral edges to prevent the woven aspect of liner 13 from coming unraveled. For example, an embodiment of pipe liner 13 includes longitudinal edges that have been hot melted and fused selvaged, which is preferred. Catchcord yarn (not shown) may also be utilized to hold fill strands 16 in place during the weaving process. The outcome of this weaving is preferred pipe liner 13 having forty-five (45) warp ends per inch and forty-five (45) fill picks per inch.

Preferred pipe liner 13 has been tested in view of the American Society for Testing and Materials (ASTM, now ASTM International), particularly for material grab tensile strength, stiffness, and cantilever stiffness (see ASTM D5034, D4032, and D1388 Option A). With a material that is approximately forty-two inches (42") wide, thirteen thousandths of an inch (0.013") thick, weighing five and fifteen hundredths of an ounce squared per yard (5.15 oz$^2$/yd), fill strands 16 and warp strands 17 forming pipe liner 13 have the following characteristics:

A one inch (1") section of fill strands 16 (approximately forty-five strands 16 per inch) defines a grab tensile strength of at least three hundred pounds force (300 lbf);

A one inch (1") section of warp strands 17 (approximately forty-five strands 17 per inch) defines a grab tensile strength of at least one hundred eighty pounds force (180 lbf);

A single-ply section folded into a four inch by by inch (4"×4") 2-ply section of fill strands 16 defines a stiffness of at least thirteen (13) newtons;

A single-ply section folded into a four inch by by inch (4"×4") 2-ply section of warp strands 17 defines a stiffness of at least fourteen (14) newtons; (same as above)

A twenty millimeter by ten inch (20 mm or 0.79"×254 mm or 10") section of fill strands 16 defines a cantilever stiffness length, determined as the bending length on an inch of material at forty-one degrees (41°), of at least five and one hundred and fifty-seven thousandths inches (5.157");

A twenty millimeter by ten inch (20 mm or 0.79"×254 mm or 10") section of warp strand 17 defines a cantilever stiffness length of at least one and twenty-four thousandths inches (1.024"), (same as above)

A twenty millimeter by ten inch (20 mm or 0.79"×254 mm or 10") section of fill strand 16 defines a cantilever stiffness strength, determined as the flexural rigidity of the material at forty-one degrees (41°), of at least five thousand six hundred microJoules per meter (5600 uJ/m); (same as above) and A twenty millimeter by ten inch (20 mm or 0.79"×254 mm or 10") section of warp strand 17 defines a cantilever stiffness strength of at least forty-three and eight tenths microJoules per meter (43.8 uJ/m) (20 mm×10").

These test measurements are included to identify the characteristics of preferred pipe liner 13 and should not be used to restrict the scope of the instant invention. For example, it is within the scope of the instant invention to utilize fill strands 17 and warp strands 17 that define all, some, or completely different characteristics as those listed above, such as different filament and strand size, filament and strand material, strand and filament denier, and so on, as long as the resulting pipe liner 13 retains the preferred anisotropic ability. Similarly, it should be noted that one of ordinary skill in the art may utilize different mechanical components to those listed above to produce liner 13. It is understood that variation in loom type, dents per inch, and reed spread are within the scope of the instant invention.

While pipe liner 13 is described as the primary use for the web formed cylindrically from fill strands 16 and warp strands 17, a planar embodiment (not shown) of liner 13 is also contemplated within the scope of the instant invention. Formed in the same manner as described above and below, this planar liner could be used in situations where longitudinal flexibility is desirable, but lateral stability is also important. For example, fabric conveyor belts are often advantageous as a means of transporting large quantities of items in an industrial setting, as they can be manufactured and replaced for relatively low cost. However, in order to support goods while being deployed in a continuous loop, the belt must be laterally rigid to carry goods but longitudinally pliable to pass around gears, sprockets, rollers, or other drive wheels.

A method of producing pipe liner 13 includes the steps of providing a weaving machine with a highly polished reed spread of at least seventy-five inches (75") with at least twenty (20) dents per inch and configured to produce two (2) ends per dent, as well as having light weight and highly polished heddles and drop wires, for example a two hundred-twenty centimeter (220 cm) Picanol Optimax Rapier™ weaving machine. The method also includes the step of providing a plurality of six hundred ten (610) denier polyester monofilaments oriented in the fill direction to serve as fill strands 16, and a plurality of polyester warp strands 17 formed from thirty-four (34) threads of two hundred-twenty (220) denier polyester threads. The method may further include the step of providing a catchcord for positioning on opposing outboard longitudinal sides of pipe liner 13 to hold fill strands 16 and warp strands 17 in place during the weaving process. Fill strands 16 and warp strands 17 are woven together in a plain weave pattern with a straight draw, with two warp strands 17 passing alternatingly above and below each fill strand 16 until pipe liner 13 reaches a desired length. The fabric is removed from the weaving machine and assembled in panels to the desired shape, such as a cylinder.

The illustrations and examples provided herein are for explanatory purposes and are not intended to limit the scope of the appended claims.

I claim:

1. A pipe comprising a flexible jacket formed from a fiberglass material positioned between an anisotropic fabric and a cylinder, whereby the anisotropic fabric is configured to cover a gap defined by the jacket upon flexion.

2. The pipe of claim 1 whereby the cylinder is formed from a polymeric material.

3. The pipe of claim 2 whereby the cylinder is formed from a high density polyethylene.

4. The pipe of claim 1 whereby the anisotropic fabric is formed from a woven yarn.

5. The pipe of claim 1 whereby the anisotropic fabric is formed from a monofilament polyester.

6. The pipe of claim 1 whereby the anisotropic fabric is formed from a polyester warp material and a monofilament polyester fill material.

7. A pipe comprising a flexible jacket formed from a fiberglass material positioned between an anisotropic fabric and a cylinder, and a cylindrical shield sized to receive the anisotropic fabric, the flexible jacket, and the cylinder therein, whereby the anisotropic fabric is configured to cover a gap defined by the jacket upon flexion without becoming inserted within said gap.

8. The pipe of claim 7 whereby the cylinder is formed from a polymeric material.

9. The pipe of claim 8 whereby the cylinder is framed from a high density polyethylene.

10. The pipe of claim 7 whereby the flexible jacket is formed from a metallic material.

11. The pipe of claim 7 whereby the anisotropic fabric is formed from a polyester.

12. The pipe of claim 11 whereby the anisotropic fabric is formed from a monofilament polyester.

13. The pipe of claim 12 whereby the anisotropic fabric is formed from a polyester warp material and a monofilament polyester fill material.

14. The pipe of claim 13 whereby the polyester fill material is defined by a plurality of polyester monofilament strands each defining a quarter millimeter (0.25 mm) diameter.

15. The pipe of claim 13 whereby the polyester fill material is defined by a plurality of six hundred ten (610) denier polyester monofilament strands.

16. The pipe of claim 13 whereby the polyester warp material is defined by a plurality of polyester strands each formed from two hundred-twenty (220) denier polyester threads.

17. The pipe of claim 16 whereby the plurality of polyester strands are each formed from thirty-four (34) polyester threads.

* * * * *